(12) United States Patent
Kronemeyer

(10) Patent No.: US 8,973,973 B2
(45) Date of Patent: Mar. 10, 2015

(54) MODULAR TRAILER SKIRT

(71) Applicant: Brian S. Kronemeyer, Hudsonville, MI (US)

(72) Inventor: Brian S. Kronemeyer, Hudsonville, MI (US)

( * ) Notice: Subject to any disclaimer, the term of this patent is extended or adjusted under 35 U.S.C. 154(b) by 0 days.

(21) Appl. No.: 14/203,711

(22) Filed: Mar. 11, 2014

(65) Prior Publication Data

US 2014/0265438 A1    Sep. 18, 2014

Related U.S. Application Data

(60) Provisional application No. 61/781,275, filed on Mar. 14, 2013.

(51) Int. Cl.
*B62D 35/00*    (2006.01)

(52) U.S. Cl.
CPC .................................. *B62D 35/001* (2013.01)
USPC ...................................................... 296/180.4

(58) Field of Classification Search
USPC .......................................... 296/180.4, 180.1
See application file for complete search history.

(56) References Cited

U.S. PATENT DOCUMENTS

| | | | |
|---|---|---|---|
| 3,960,402 A | 6/1976 | Keck | |
| 4,421,354 A | 12/1983 | Lemaster | |
| 5,921,617 A * | 7/1999 | Loewen et al. | 296/180.4 |
| 7,484,791 B1 | 2/2009 | Chen | |
| 7,641,262 B2 | 1/2010 | Nusbaum | |
| 7,862,102 B1 | 1/2011 | Benton | |
| 8,136,868 B2 | 3/2012 | Nusbaum | |
| 8,235,456 B2 | 8/2012 | Nusbaum | |
| 8,251,436 B2 | 8/2012 | Henderson et al. | |
| 8,342,595 B2 | 1/2013 | Henderon et al. | |
| 8,491,036 B2 | 7/2013 | Henderson et al. | |
| 8,684,447 B2 | 4/2014 | Henderson et al. | |
| 2007/0120397 A1* | 5/2007 | Layfield et al. | 296/180.4 |
| 2011/0095564 A1 | 4/2011 | Chen | |
| 2013/0113235 A1 | 5/2013 | Henderson et al. | |

FOREIGN PATENT DOCUMENTS

CA    2798612    11/2011

* cited by examiner

*Primary Examiner* — Joseph D Pape
(74) *Attorney, Agent, or Firm* — Price Heneveld LLP

(57) ABSTRACT

A trailer skirt includes a plurality of panel modules attached under and along sides of a trailer. Each panel module comprises an outwardly angled flat panel with upper edge attached to a trailer undercarriage frame and a forward edge tabbed to slots in an inward-stepped rear edge of an adjacent identical panel module. The stair-stepped surface and leak-free connection provides excellent low air drag, and also provides good orientation of reflectors for lights when passing another vehicle. A modularity of the panel modules and their low weight allows them to be molded in an efficient and low cost manufacturing operation, shipped in a very compact and dense arrangement, quickly installed, and allows individual panel modules to be replaced without total disassembly of the skirt.

20 Claims, 4 Drawing Sheets

MODULAR TRAILER SKIRT

CROSS-REFERENCE TO RELATED APPLICATION

This application claims benefit under 35 USC section 119(e) of a provisional application Ser. No. 61/781,275, filed Mar. 14, 2013, entitled MODULAR TRAILER SKIRT, the entire contents of which are incorporated herein by reference.

BACKGROUND

The present invention relates trailer skirts used along sides of a truck trailer to reduce air drag and hence improve gas mileage.

Many companies attach skirts below sides of trailers in order to reduce air drag around trailer wheels and undercarriage. However, known trailer skirts are expensive to manufacture and ship, difficult and time consuming to install, and often are not as durable and robust as desired.

SUMMARY OF THE PRESENT INVENTION

In one aspect of the present invention, a trailer skirt includes a plurality of panel modules configured for attachment under and along sides of a trailer and attached to each other. In a narrower form, the panel modules each include first connectors for connecting to the undercarriage of the trailer and second connectors for connection to each other.

In another aspect of the present invention, a trailer skirt module comprises a panel has an upper edge with attachment flange for attachment to a trailer undercarriage frame, and having forward and rearward edges with flanges configured for attachment to an adjacent identical panel module.

In another aspect of the present invention, a trailer comprises a trailer, and at least one panel attached under and along each side of a trailer, the at least one panel defining an outboard surface with alternating first sections that are outwardly angled and second sections that extend inwardly.

In another aspect of the present invention, a method comprises steps of providing a plurality of panel modules configured for abutting attachment to each other, and attaching the panel modules to each other and also attaching them under and along sides of a wheeled cargo carrier.

An object of the present innovation is to provide a panel module that can be molded in an efficient and low cost manufacturing operation, with minimized tooling cost due in part to a reduced size of the mold tooling.

An object of the present invention is to provide a modular system that can be shipped in a very compact and dense arrangement, thus saving shipping costs.

An object of the present invention is to provide a modular system where individual panel modules can be handled more easily, thus allowing them to be assembled to a trailer much more easily and efficiently.

An object of the present invention is to provide a modular system where a shape of the skirt once the panel modules are assembled to a trailer provides a robust and durable assembly, and that creates a very efficient system for reducing air drag.

An object of the present invention is to provide a modular system where individual damaged panel modules can be replaced without disconnection and/or removal of other panel modules, thus providing a tremendous cost benefit.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
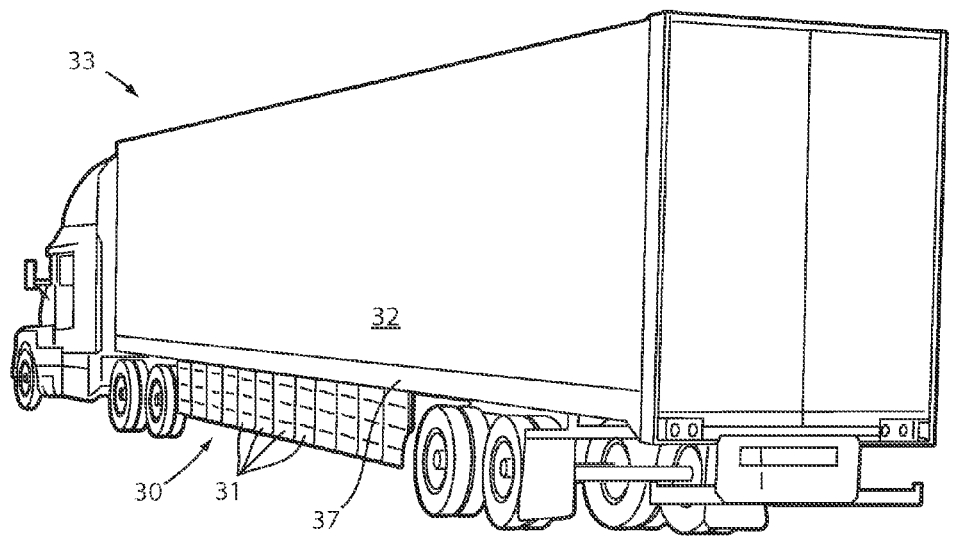
FIG. 1 is a perspective view of a semi trailer with modular panels interconnected to form a skirt along edges of the trailer, with the skirt embodying the present invention.
Figure 2:
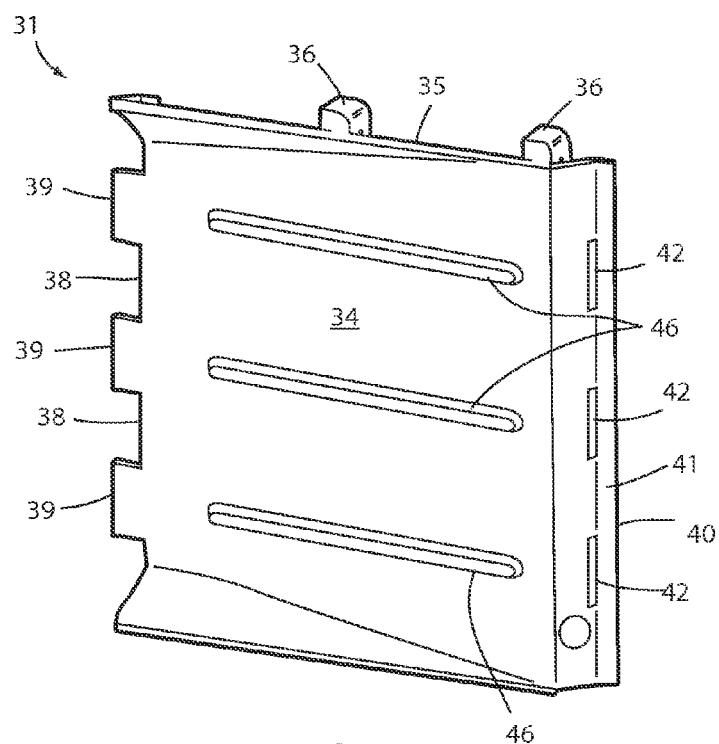
FIG. 2 is a perspective view of one of the panel modules forming the skirt in FIG. 1.
Figure 3:
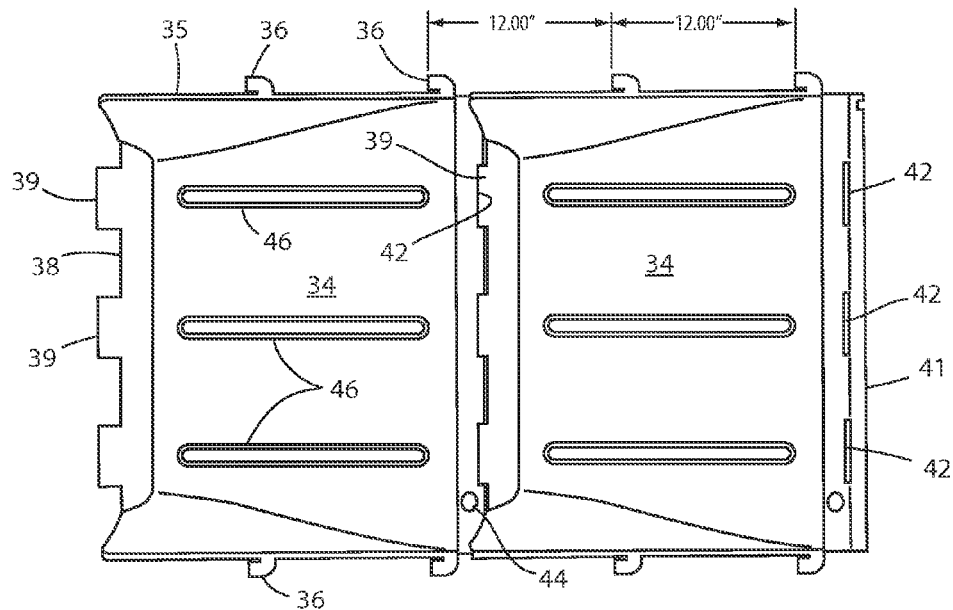
FIG. 3 is a side view of two skirt panel modules connected together.

The present apparatus a trailer skirt 30 (FIG. 1) includes a plurality of panel modules 31 configured for attachment under and along sides 32 of a semi trailer 33 (or other wheeled cargo carrier or box truck, hereafter referred to collectively as "wheeled cargo carrier") and attached to each other. Each panel module 31 comprises a relatively flat panel 34 having an upper edge 35 with attachment flanges 36 for attachment to cross beams 37 (typically I beams) forming a trailer undercarriage frame (i.e. floor support for the trailer), and having a forward edge 38 with tab flanges 39 and rearward edge 40 with inward L flange 41 and tab slots 42 configured to receive tab flanges 39 of an adjacent identical panel module 31. The flat panel 34 of each panel module 31 defines an outboard surface that extends at a slight outwardly angle (at a small angle from front to rear). The inward L flange 41 includes an inwardly-extending leg that extends from a rear edge of the flat panel 34 inwardly at about a 60-80 degree angle (or more preferably about a 70-75 degree angle). Reflectors 44 are positioned on inwardly-extending leg of the L flange 41 and the inward leg of the L flange 41 orients the reflectors 44 at a best angle for reflecting headlights when the tractor and trailer are passing another vehicle. The modularity of the panel modules 31 allows them to be molded in an efficient and low cost manufacturing operation, and to be shipped in a very compact and dense arrangement. The low weight and size of the individual panel modules 31 also facilitates handling of the panel modules 31, thus allowing them to be assembled to a trailer much more easily.

Figure 4:
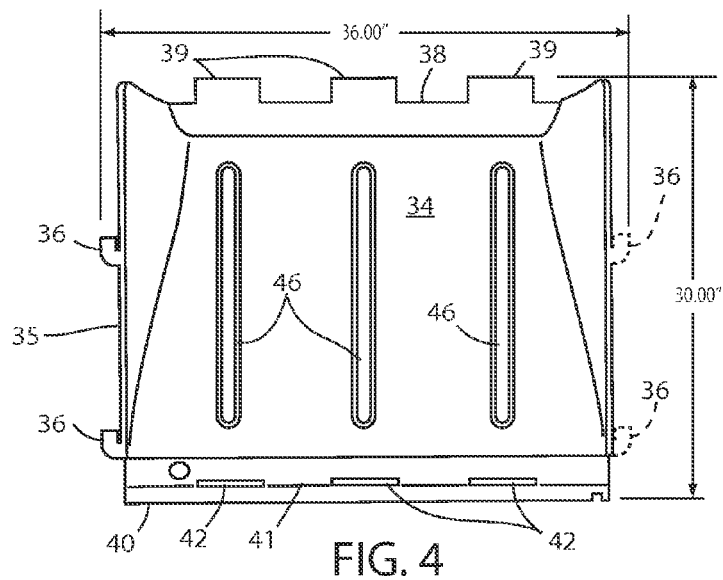
FIGS. 4-5 are plan and top views of the skirt panel module of FIG. 3.
Figure 5:
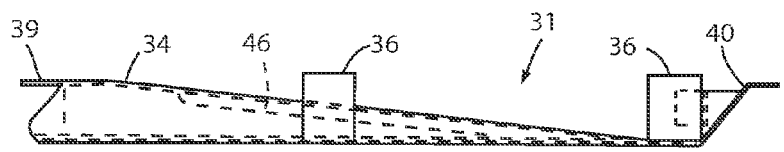
Figure 9:
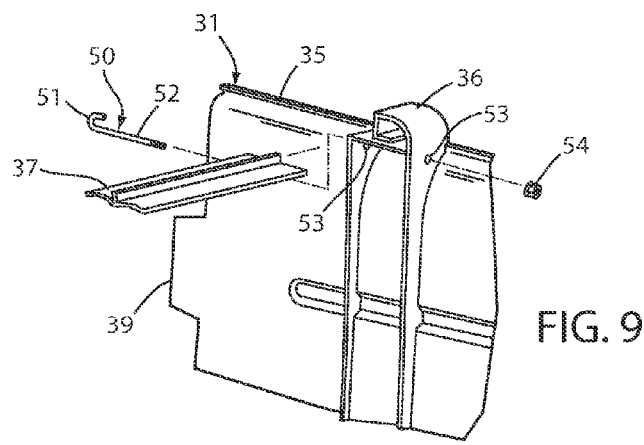
FIG. 9 is an exploded fragmentary perspective view of an upper inboard edge of adjacent modular panels and cross frame rails of the trailer's undercarriage.

The attachment flanges 36 along the upper edge of the flat panel 34 are hook-shaped and configured to engage a bottom flange of the I-beam cross beams 37, such that the attachment flanges 36 can be quickly rested on and then attached to the cross beams 37 of the undercarriage structure using clamps and/or other attachment hardware such as hooks 36 and J-bolts 50 (see FIG. 9). It is noted that the attachment flanges 36 are located on a single (top) side of the panel module 31. As a result (as illustrated in FIG. 4), the panel module 31 for a right side of a trailer is a mirror image of the panel module 31 for a left side. One way of manufacturing the panel module 31 is to create an injection molding tool/die-half with interchangeable inserts, one insert being for forming the attachment flanges 36 and one insert being for forming an edge without any attachment flanges. The inserts are interchanged in the molding dies, depending on whether right-side or left-side panel modules 31 are being molded. Alternatively, hooks 36 can be molded on top and bottom edges and if not wanted, can be cut off one side.

Figure 6:
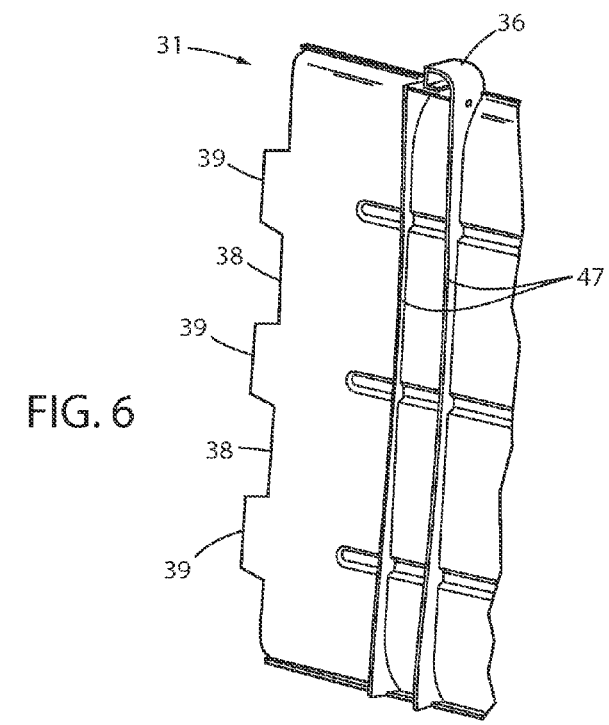
FIG. 6 is a fragmentary view of an inboard surface of a forward edge of the panel module of FIG. 3.
Figure 7:
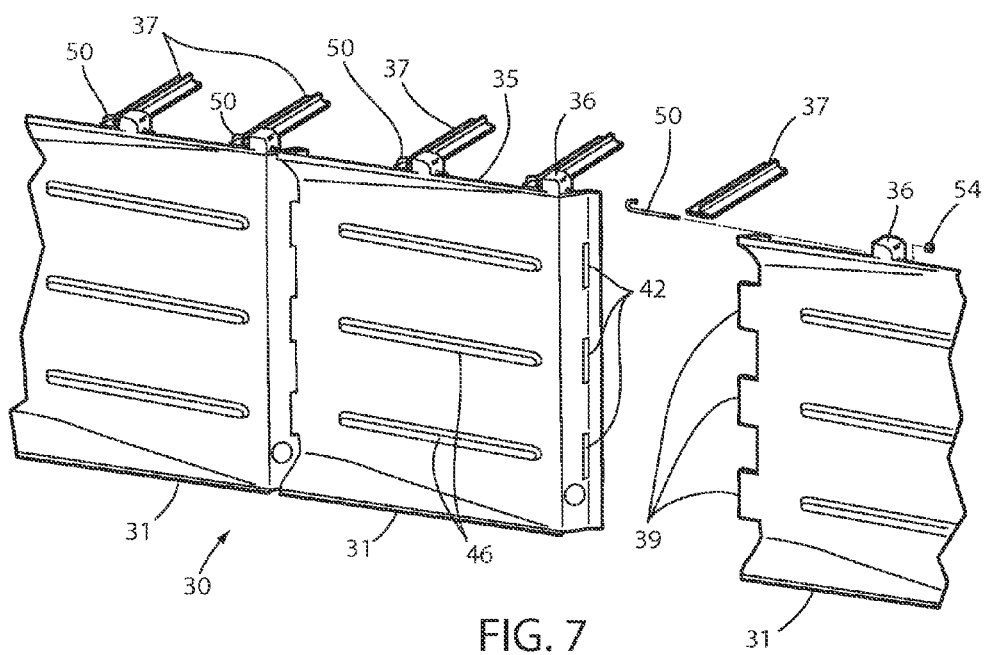
FIG. 7 is a perspective view of three panel modules, two connected to each other and to an undercarriage framework of the trailer, and one ready for connection to the other panel modules, the undercarriage framework being exposed to show the connection.
Figure 8:
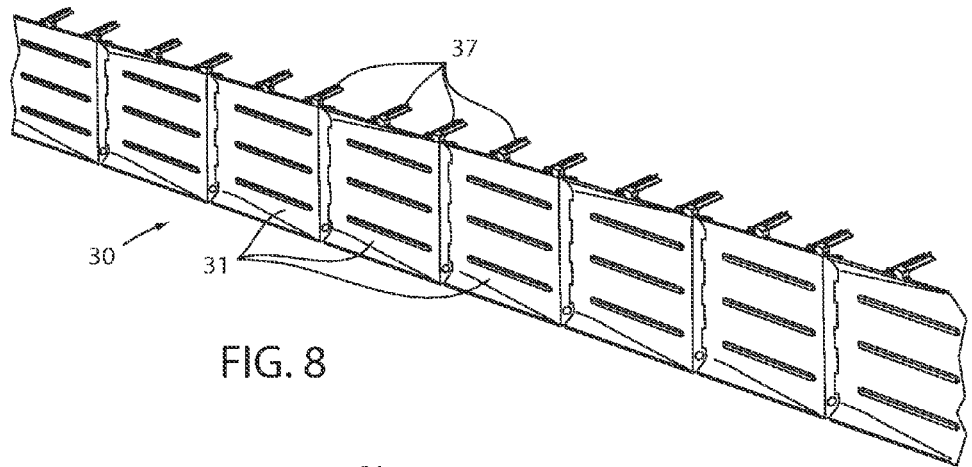
FIG. 8 is a perspective view of the skirt made of interconnected modular panels that are attached to the trailer undercarriage, FIG. 8 being like FIG. 1 but with the trailer side and floor removed to reveal the connections.

Notably, a shape of the skirt 30 once the panel modules 31 are assembled to a trailer 33 is robust, durable, and creates a very efficient system for reducing air drag. This is due to a majority of the outboard surface of the assembled skirt 30 having an outward angle (in a front-to-rear direction), and due to the inward "bent" direction of the L flange 41, which adds structural strength to the assembled skirt 30. Still further, the modularity allows individual damaged panel modules 31 to be replaced without disconnection and/or removal of other panel modules 31, which is a tremendous cost benefit. It is noted that the flat panel 34 of the panel modules 31 includes vertically spaced horizontal channel ribs 46, thus stiffening the panel modules 31. Also, a pair of vertical ribs 47 (FIG. 6) on an inboard surface of the flat panel 34 is located about 4-8 inches rearward of the tab flanges 39. The vertical ribs 47 stiffen the flat panel 34 vertically. However, it is noted that the vertical ribs 47 include a relatively shallow middle portion, which allows the flat panel 34 to flex along its horizontal center region (rather than resist bending and hence fracture or break), such as if the individual panel module 31 is impacted along a lower edge of the panel module 31.

The illustrated panel module 31 is injection molded using UV stabilized fiberglass reinforced composite, which gives it significant durability and robustness. Also, the total weight of the illustrated skirt 30 is just under 125 pounds (including attachment hardware), which is well below known comparable skirts. This low weight is beneficial since a total weight of the trailer is not increased unacceptably, but also this low weight is a great benefit due to the high cost of shipping product to installers and trucking companies. Also, the low weight and modularity allows the present system to be installed in less than about 2 hours, as compared to up to 8 hours for installation of existing know skirt systems. The panel modules 31 interlockingly engage by the tab flange 39 engaging the tab slots 42 on adjacent panel modules 31 to create joint that is relatively air tight, thus providing a substantially leak-free connection. The modularity of the present system allows more or less of the panel modules 31 to be used on substantially any size trailer, thus allowing the present system to be used on substantially any size trailer, without the need for special or custom components.

The stair-stepped outboard surface of the present skirt 30 (i.e. the repeated slight outward angle of the flat panels 34 combined with the sharply-inward shape of the L flange 41, in combination with the longitudinal channel ribs 46, and in combination with the leak-free connection at front/rear edges of adjacent panel modules 31, causes a clean and low air drag causing system, which assists in obtaining good gas mileage. Notably, the longitudinal channel ribs 46 also tend to prevent air from slipping under the skirt 30, which also help gas mileage and hence is seen as a great benefit. The rear facing reflectors 44 are supported at an optimal angle on the L flanges 41 to optimally catch light from passing vehicles for improved visibility at road level. Performance of the present skirt 30 with panel modules 31 has tested to be equal or better than comparable or even larger size skirts.

It is contemplated that a shape and size of the present panel modules 31 and of the overall assembled skirt 30 can be varied and still be within a scope of the present invention. The illustrated panel modules 31 are about 30-36 inches vertically (e.g. about 30-32 inches for lower trailers, and greater for higher trailers) and are about 24-30 inches long in a fore-aft direction (such as about 24-27 inches for smaller trailers or where needed) and are about 2-4 inches thick in a cross-trailer direction. A shape and installed position of the present skirt 30 keeps ground contact to a minimum. For example, the ground clearance can be about 24-36 inches, or more preferably about 28-32 inches or about half a wheel height. Top hooks 36 are spaced apart to match cross frame beams 37 on a given trailer, such as about 12 inches apart.

FIG. 9 is an exploded fragmentary perspective view of an upper inboard edge of adjacent modular panels and cross frame rails of the trailer's undercarriage. With the panels interconnected by engagement of tabs 39 with slots 42, a J-bolt 50 includes a hook end 51 that engages a flange on the cross beam 37. The shaft 52 of the J-bolt 50 extends through holes 53 in the two adjacent modular panels 31, and a nut 54 secures the J-bolt 50 in place, securing the adjacent modular panels 31 to each other and to the trailer's undercarriage frame via cross beam (37).

Figure 10:
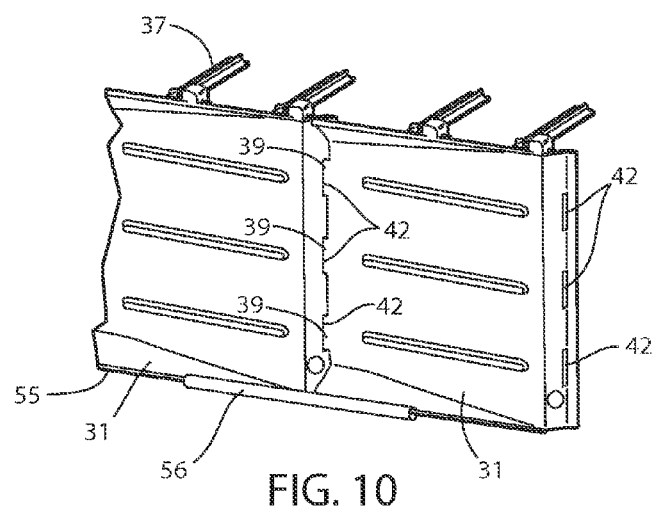
FIG. 10 is an enlarged fragmentary perspective view of a lower outboard side of adjacent modular panels with a lower connecting cable arrangement reinforcing a lower edge.

FIG. 10 is an enlarged fragmentary perspective view of a lower outboard side of adjacent modular panels with a lower tube-splice connecting arrangement reinforcing their aligned lower edges. The connecting arrangement is attached to the lower flange 55 on each panel 31, and includes a connector tube 56 made of resilient material and slit so that the slit can be slipped onto the flange 55 forming the lower edge of the modular panels 31. The tubes 56 are a same length as the panels 31, but are offset so that an end of each tube 56 overlaps halfway onto each of the adjacent panels 31. The installed tubes 56 provide additional strength and stability and alignment to the assembly of modular panels 31. A shorter tube (56), half as long as the remaining tubes 56, can be attached to the forward-most panel 31 and to the rearward-most panel 31, so that the skirt has a more uniform appearance completely along its length. The lower flange 55 preferably has an enlarged tip so that the tube 56, when matably engaged, has the enlarged tip frictionally positively held within a diameter of the tube 56.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A trailer skirt comprising:
    a plurality of interconnected panel modules configured for attachment under and along sides of a wheeled cargo carrier and attached to each other, the panel modules having outwardly-angled surfaces and inwardly-angled surfaces that form a combined outboard surface defining a stair-stepped longitudinal shape.

2. The trailer skirt defined in claim 1, wherein at least some of the panel modules include front and rear edges configured to engage each other.

3. The trailer skirt defined in claim 1, including mating connectors on the front and rear edges that matably engage when the panel modules are positioned adjacently.

4. The trailer skirt defined in claim 3, wherein the mating connectors include at least three mating pairs of connectors.

5. The trailer skirt defined in claim 3, wherein the mating connectors include a tab and a slot, with the tabs being blade-shaped and extending longitudinally from an edge of the modules, and the slots being through holes in the modules.

6. The trailer skirt defined in claim 1, including upwardly extending connectors shaped to engage cross beams on an undercarriage of the wheeled cargo carrier.

7. The trailer skirt defined in claim 6, wherein the upwardly extending connectors include a J-bolt securing the upwardly extending connectors to a particular cross beam of the undercarriage.

8. The trailer skirt defined in claim 1, including a lower longitudinal connector that engages a bottom edge of adjacent abutting panel modules.

9. A trailer skirt comprising:
a plurality of interconnected panel modules configured for attachment under and along sides of a wheeled cargo carrier and attached to each other; and
a lower longitudinal connector engaging a bottom edge of adjacent abutting panel modules, the lower longitudinal connector including at least one slit tube that spans a joint between the adjacent panel modules.

10. The trailer skirt defined in claim 1, including upper connectors securing the panel modules to cross beams on an undercarriage of the wheeled cargo carrier, and including fore-aft mating connectors that connect adjacent abutting ones of the panel modules together.

11. The trailer skirt defined in claim 10, including a lower longitudinal connector that engages a bottom edge of the adjacent abutting panel modules.

12. A trailer skirt module comprising:
a panel module having an upper edge with an attachment flange for attachment to a trailer undercarriage frame, and having a front section defining a rearwardly outwardly angled plane and a rear section defining a rearwardly inwardly angled plane, the front and rear sections including forward and rearward edges with fore-aft-extending mating connectors configured for abutting attachment to an adjacent identical panel module without the use of separate mechanical fasteners.

13. A trailer apparatus comprising:
a trailer; and
at least three panels attached under and along each side of the trailer, the at least three panels defining an outboard surface with first sections that are outwardly angled and second sections that extend inwardly, the first and second sections defining, when assembled and cross sectioned horizontally, an alternating sequence of outwardly-angled surfaces and inwardly-angled surfaces that form a combined outboard surface defining a stair-stepped longitudinal shape.

14. A method comprising steps of:
providing a plurality of panel modules with front and rear vertical edges configured for abutting attachment to each other, one of the front and rear vertical edges having at least three vertically-spaced planar tabs and the other of the front and rear vertical edges having at least three vertically-spaced slots for receiving the planar tabs; and
attaching the panel modules horizontally to each other without the use of separate fasteners and also attaching them under and along sides of a wheeled cargo carrier; the step of attaching including horizontally extending the at least three planar tabs into the at least three slots in each adjacent pair of the panel modules.

15. A trailer skirt comprising:
a plurality of interconnected panel modules configured for attachment under and along sides of a wheeled cargo carrier and attached to each other, the interconnected panel modules each including two vertical edges with spaced-apart slot-engaging tabs and mating tab-receiving slots, with the tabs engaging the slots to fix abutting edges of adjacent ones of the panel modules vertically and laterally.

16. The trailer skirt in claim 15, wherein the tabs and slots engage and secure the panel modules relative to each other without the need for separate mechanical fasteners along the vertical edges.

17. A trailer skirt comprising:
a plurality of interconnected panel modules configured for attachment under and along sides of a wheeled cargo carrier and attached to each other, the panel modules each including an upper horizontal edge with at least one upwardly protruding integral flange, the flange defining at least one horizontal hole receiving a J-bolt horizontally so that a J-shaped end of the J-bolt can be positioned to engage a floor frame of the wheeled cargo carrier.

18. A trailer skirt comprising:
a plurality of interconnected panel modules configured for attachment under and along sides of a wheeled cargo carrier and attached to each other, the panel modules each including a one-piece panel with front and rear edges forming integral connectors that mate longitudinally when the front and rear edges of adjacent panel modules are abutted to fix abutting edges of adjacent ones of the panel modules vertically and laterally.

19. The trailer skirt defined in claim 18, wherein the panel modules include inwardly-angled and outwardly-angled outboard surfaces, and including a light reflector on one of the angled surfaces that is visible from a front of a trailer having the trailer skirt thereon.

20. The trailer skirt defined in claim 1, wherein the panel modules include a light reflector on one of the outwardy-angled and inwardly-angled surfaces that is visible from a front of a trailer having the trailer skirt thereon.

* * * * *